United States Patent [19]

Luck et al.

[11] 4,175,150
[45] * Nov. 20, 1979

[54] UREA CONTAINING HIGH DENSITY SKIN FIBERBOARD WITH A LOW DENSITY CORE

[75] Inventors: Allan J. Luck, Marengo; John T. Clarke; Michael R. Hoffman, both of St. Charles, all of Ill.

[73] Assignee: Masonite Corporation, Chicago, Ill.

[*] Notice: The portion of the term of this patent subsequent to Nov. 20, 1996, has been disclaimed.

[21] Appl. No.: 739,184

[22] Filed: Nov. 5, 1976

[51] Int. Cl.² .................... B32B 5/14; B32B 7/02; B29J 5/04
[52] U.S. Cl. .................... 428/171; 428/218; 428/236; 428/301; 428/526; 156/62.8; 156/285; 156/331; 162/101; 264/128; 264/113
[58] Field of Search .................... 156/285, 62.8, 331, 156/62.2; 428/526, 236, 171, 301, 218

[56] References Cited

U.S. PATENT DOCUMENTS

| | | | |
|---|---|---|---|
| 1,663,503 | 3/1928 | Mason | 162/13 |
| 1,663,504 | 3/1928 | Mason | 162/101 |
| 1,663,506 | 3/1928 | Mason | 162/101 |
| 1,812,969 | 7/1931 | Mason | 162/163 |
| 1,812,970 | 7/1931 | Mason | 162/101 |
| 1,953,832 | 4/1934 | Sandell | 92/21 |
| 2,716,617 | 8/1955 | Austin, Jr. et al. | 428/526 X |
| 2,872,337 | 2/1959 | Heritage et al. | 117/11 |
| 3,062,699 | 11/1962 | Raphael et al. | 428/531 X |
| 3,285,801 | 11/1966 | Sarjeant | 428/221 |
| 3,673,021 | 6/1972 | Joa | 156/62.8 |
| 3,699,203 | 10/1972 | Oshima et al. | 264/113 X |
| 3,762,974 | 10/1973 | Wirz | 156/62.8 |
| 3,927,235 | 12/1975 | Chow | 428/526 X |
| 3,959,005 | 5/1976 | Bruun et al. | 106/163 R |
| 4,007,076 | 2/1977 | Clarke et al. | 428/301 |
| 4,012,561 | 3/1977 | Doughty | 428/526 |

*Primary Examiner*—P. C. Ives
*Attorney, Agent, or Firm*—Mason, Kolehmainen, Rathburn & Wyss

[57] ABSTRACT

A fiberboard is manufactured having relatively high density skins on a relatively low density core by including urea in at least the surface fibers of a consolidated mat, having a density of less than 35 pounds per cubic foot, and then hot-pressing the consolidated mat at a temperature of at least 525° F. to form a board having high density surface skins.

35 Claims, 1 Drawing Figure

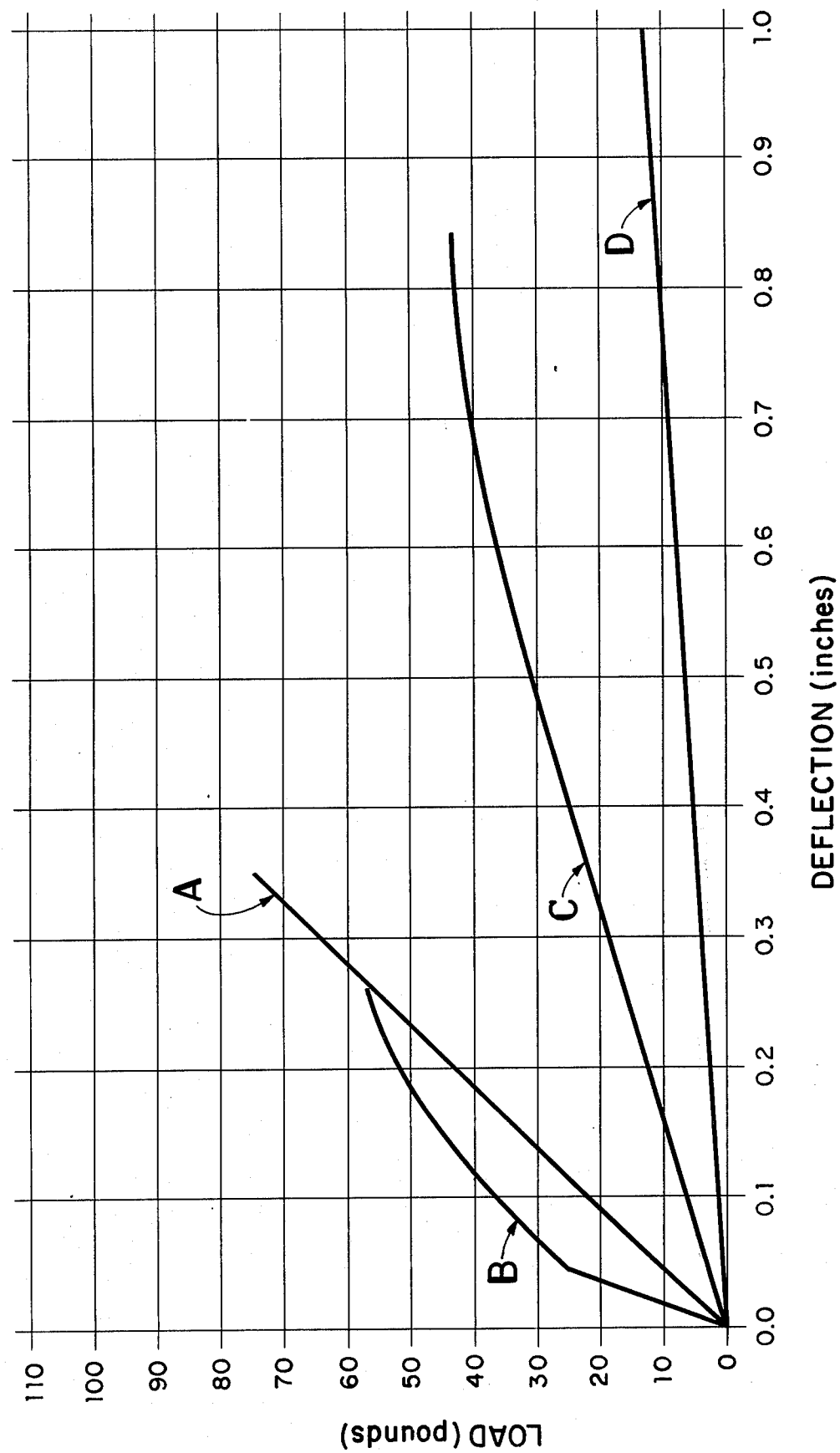

UREA CONTAINING HIGH DENSITY SKIN FIBERBOARD WITH A LOW DENSITY CORE

FIELD OF THE INVENTION

The present invention relates to a fiberboard panel having a relatively low density core or central portion and having relatively high density skins or surface portions. More particularly, the present invention relates to a man-made board having high density skins or surface portions as an integral part of a relatively low density core wherein the high density skins are produced by contacting the surface fibers of a relatively low density consolidated board with urea, and thereafter hot-pressing the board in a post-press or second pressing operation at a temperature of at least 525° F. to densify the surface portions into smooth, stiff, hard, dense skins.

BACKGROUND OF THE INVENTION

The process of the present invention relates to a "post-press" or second press operation for creating thick, hard, integral surface portions on at least one and preferably both surfaces of a man-made fiberboard substrate. A handleable mat is first manufactured by consolidating a cellulosic fiber-containing composition to form a consolidated fiberboard having a density of less than 35 pounds per cubic foot. The handleable mat can be consolidated by drying a mat formed by depositing a water slurry of fibers onto a water pervious support member, as is common in the manufacture of insulation board, or the mat can be consolidated under heat and pressure until substantially dry in a first press operation. This consolidated mat is thereafter "post-pressed" to form dense surface layers for stiffness and strength, while retaining the relatively low density core or central portion. The density of the core is substantially predetermined when the mat is initially consolidated. For the purpose of the present invention, a "post-press" operation refers to a press step performed on the handleable mat after consolidation thereof.

It is necessary to form the fiberboard of the present invention in two separate operations. The first operation forms a consolidated mat and sets the core density while the second or "post-press" operation creates the denser surface portions. It is quite surprising that a "post-press" or second pressing operation is effective in densifying a surface of a consolidated mat while leaving the density of the core material substantially unchanged. Prior to the present invention, it was thought that the qualities and physical characteristics of a board would be finally determined by the conditions under which the board is initially consolidated and by the raw materials used to form the board, because of the bonding occurring during consolidation.

Much of the bonding necessary for cohesion and strength in a man-made board occurs during the consolidation of the board during hot-pressing. Prior to drying a board made by the wet process, the board is weak, but the bonding forces created during the final consolidation are generally quite powerful. Generally the same bonding effect occurs in the final consolidation of a board made by the dry process. Prior to hot-pressing, the loosely disassociated cellulosic fibrous product is quite weak, but after hot-pressing the mat into its final configuration, it is very powerfully held together by the bonding which occurs during hot-pressing. Hot-pressing during consolidation causes a welding or coalescing of the cellulose fibers at the surface of the product so that the surface portion consists of wood remade in modified form. It is very difficult to densify or restructure the surface of a consolidated product without again destroying these fiber-to-fiber surface welds. It is especially difficult to densify only a surface portion of a consolidated board in an amount sufficient to substantially increase the strength and stiffness of the product while retaining the lightweight core material to provide a lightweight product. The process described herein accomplishes these results.

A prior application, assigned to Masonite, Ser. No. 537,254 filed Aug. 23, 1974, now U.S. Pat. No. 4,007,076 discloses and claims a method of post-press embossing consolidated, man-made boards to effectively and accurately reshape the surface of a completed panel without surface defects such as surface fiber tearing. In accordance with Ser. No. 537,254 filed Aug. 23, 1974, a previously consolidated panel is post-press embossed at a pressure of at least 1000 psi to create a surface design, or to permanently redesign the surface of a consolidated product without destroying the interfiber bonding established at the surface of the board during consolidation. The product thus formed does not include a relatively low density core or central portion.

In accordance with the present invention, it has been found that the surface density and physical characteristics of a relatively low density consolidated mat can be altered in a post-press operation to harden, smooth, and densify the surfaces thereof when at least the surface fibers of the mat are contacted with urea. During the post-press operation, at a temperature of at least 525° F., the urea reacts to stiffen and strengthen the cellulosic substrate, such as a low density fiberboard, to provide the necessary strength for the intended purpose of the substrate while retaining a relatively low density, lightweight central core of the material. In this manner, the resulting post-pressed substrate is very lightweight while having strength and stiffness properties equal to or better than much heavier boards.

Prior Art

An extensive search was performed to determine the prior art use of urea in the manufacture of cellulose fiber-containing substrates. Various patents and abstracts were found relating to the use of urea for fire-retardance, plasticization, resistance to aging, and as a binder. None of these patents or abstracts found, however, relates to the use of urea as disclosed herein, in post-pressing of a man-made cellulose fiber-containing product to provide a relatively high density, hard, stiff skin on one or more surfaces of a relatively low density core or center material. The relevant patents and abstracts found in the search are as follows:

| A.B.I.P.C. Abstracts | Patents |
| --- | --- |
|  | 2,298,017 |
| Vol. 36, No. 4; 2483; 1965 | 2,912,392 |
| Vol. 38, No. 6; 4917; 1967 | 2,912,394 |
| Vol. 39, No. 9; 7630; 1969 | 3,285,801 |
| Vol. 39, No. 11; 9657; 1969 | 3,667,999 |
| Vol. 41, No. 5; 4311; 1970 | 3,676,389 |
| Vol. 42, July-Dec.; 5715; 1971 | 3,779,861 |
| Vol. 43, No. 9; 9665; 1973 | 3,790,442 |
| Vol. 44, No. 10; 10423; 1974 | 3,881,992 |
| Vol. 44, No. 10; 10754; 1974 | 3,915,911 |
| Vol. 45, July-Dec.; 4724; 1974 | 777,090 Canada |
| Vol. 45, No. 2; 1479; 1974 |  |
| Vol. 46, No. 3; 2233; 1975 |  |

| -continued | |
|---|---|
| A.B.I.P.C. Abstracts | Patents |
| Vol. 46, N9. 5; 4954; 1975 | |

SUMMARY OF THE INVENTION

An object of the present invention is to provide a lightweight fiberboard panel having hard, dense surface skins thereon.

Another object of the present invention is to provide a lightweight cellulosic fiber-containing article having a hard, dense skin on at least one surface thereof.

Another object of the present invention is to provide a lightweight fiberboard, having a central core of material with a density in the range of 10–35 pounds/ft.$^3$, having strength and stiffness properties equivalent or better than hardboard having a density in the range of 45–65 pounds/ft.$^3$ Another object of the present invention is to provide a lightweight man-made board having design-fidelity and paint hold-out properties equal to or better than hardboards' manufactured in accordance with existing technology.

Another object of the present invention is to provide a method of providing an integral, structural skin on one or more surfaces of a cellulosic fiber-containing consolidated product by including urea within at least the surface fibers of the consolidated product, and, thereafter, post-pressing the urea treated consolidated board in a second-pressing operation at a temperature of at least 525° F.

In accordance with an important feature of the present invention, it has been found that urea will provide hard, dense surface skins to a handleable mat when the surface fibers are contacted therewith and the mat is thereafter "post-pressed" at a temperature of at least 525° F.

In accordance with another important feature of the present invention, the technology disclosed herein has been developed to provide a low density, strong cellulosic fiber-containing product, for example, fiberboard which has sufficient strength for end uses such as wall panelling, siding, and moldings. The low density, high strength product is produced by first manufacturing a low density substrate having strength sufficient to be handled in manufacture, including urea in at least the surface fibers of the substrate and thereafter post-pressing the substrate to develop dense outer layers or skins on the exterior surfaces.

Surprisingly, it has been found that the skin created by post-pressing a low density consolidated product having urea in at least the outer surface fibers thereof creates a hard, dense surface which, if desired, effectively and permanently reproduces embossing plate details on the surface of the product and creates a smooth outer surface having excellent holdout of coating materials, such as paint. The post-pressing operation restructures the surface fibers contacted with urea to provide exceptional strength and stiffness properties to a lightweight panel. The panel manufactured in accordance with the present invention compares in weight, material costs, and physical properties, such as breaking load and stiffness, to one-quarter inch hardboard panelling having a density of about 60 pounds/ft.$^3$ One-quarter inch hardboard was used as the control to determine the viability of producing the low density product of the present invention having high density, high strength skins as surface layers.

BRIEF DESCRIPTION OF THE DRAWING

The FIGURE is a graph comparing the deflection of a urea treated, post-pressed fiberboard, made in accordance with the present invention, to Gypsum board, plywood panelling, and hardboard panelling, under various loads, each having the physical properties set forth in Table VII.

DETAILED DESCRIPTION OF THE INVENTION

Low Density Handleable Mat

In accordance with the present invention, a high strength fiberboard product having hard, dense skins or surface portions thereon is manufactured in two steps. The first step comprises manufacturing a relatively low density consolidated, handleable mat, using either the wet or dry process as known in the manufacture of man-made boards; the second step comprises post-pressing the consolidated mat after first treating at least the surface fibers of the mat with urea to form a skin on the surfaces of the product.

The method of producing a consolidated mat is well known as presently used in producing man-made boards such as hardboard, chipboard, particle board, panelboard, acoustical board, insulation board, and the like. In the wet process, the raw material is uniformly blended in a head box with copious quantities of water to form a slurry. The slurry is deposited onto a water-pervious support member, generally a Fourdrinier wire, where much of the water is removed leaving a wet mat of cellulosic material. The wet mat is then drying to consolidate, as in the manufacture of insulation board, or can be transferred from the pervious support member and consolidated under heat and pressure to form the board. Typically, pressures of from 400 to 500 psi and temperatures up to about 400° F. are encountered in hot-press consolidation of a man-made board manufactured by the wet process. The dry process is similar to the wet process except that the cellulosic fibers are first coated with a thermosetting resin binder, such as a phenol-formaldehyde resin, and are then randomly distributed into a mat by air blowing the resin-coated fibers onto a support member. In the dry process, the mat is pressed at temperatures up to about 450° F. and pressures less than about 1000 psi to cure the thermosetting resin and to compress the mat into an integral consolidated structure.

The handleable mat produced in accordance with the first step of the present invention is manufactured in a conventional manner, using conventional cellulosic fiber stock. To achieve the full advantage of the present invention, the handleable mat should have a density, after consolidation, in the range of 10–35 pounds per cubic foot, preferably in the range of 15–30 pounds per cubic foot. Panels of varying thicknesses having densities within this range can be produced in accordance with known technology to provide lightweight core materials on which a surface skin can be developed in accordance with the following disclosure.

Handleable mats have been produced having a density as low as ten pounds per cubic foot and a thickness of one and one-half inches. Mats having densities as low as ten pounds per cubic foot are useful as the handleable mat in producing products in accordance with the principles of the present invention. In fact, in accordance with the presention invention, any low density mat (less than 35 pounds per cubic foot) is considered to be handleable if it can survive the trimming, cutting, stacking, packing, shipping, and unloading operations necessary to produce fiberboard. All such handleable mats are useful in accordance with the principles of the present invention.

Skin Development

The consolidated mat containing urea is pressed in a post-pressing operation at a temperature of at least 525° F. to develop a surface layer herein called a "skin", defined as an outer layer having a higher density than a thickness of material over which it is formed. It was found in early investigations that heat and pressure alone would not form a thick skin on the surface of a low density panel. Skin thickness was very thin regardless of the temperature and compression. Table I shows that post-pressing alone, without urea pre-treatment, does not produce a skin.

The table also shows that the sample post-pressed with urea had a lower breaking load and a lower stiffness than the unpressed fiberboard sample by 46% and a stiffness better than the unpressed fiberboard sample by 82%. These property improvements occured even though the post-pressed sample was thinner. Normally it would be expected that the thicker product would have the higher stiffness and breaking load values.

Table I

Effect of Heat Pressure and Post-Pressing On Skin Development

| Substrate | Final Caliper (In.) | Density lb/ft$^3$ | Skin Thickness (In.) | Stiffness lb/in. | Breaking Load* lb. |
|---|---|---|---|---|---|
| fiberboard not post-pressed | 0.563 | 17 | 0 | 103 | 24 |
| post-pressed fiberboard (no urea) | 0.406 | 22 | 0 | 68 | 20 |
| fiberboard (w/urea and post-pressed at 550° F.) | 0.406 | 22 | 0.030 | 188 | 35 |

*The stiffness and breaking load data as set forth throughout this disclosure, were obtained by breaking 3" × 12" samples over a 10" span. A load was applied to the center of the span and the center of the sample was deflected at a constant rate. As the sample was deflected, the force (load) exerted on the sample was recorded. As the sample is bent, the force is continuously increased until the sample breaks. A load/deflection curve can be obtained for the tested samples, as set forth in the drawing. During the initial phases of loading, the force applied is a linear function of the deflection. The term "stiffness", as used throughout this disclosure, is the slope (lb/in.) of this linear portion of the load deflection curve. The term "breaking load", as used throughout this disclosure, is the maximum load point obtained on the load/deflection curve before the sample breaks.

Various chemicals were also evaluated on the surface of low density mats in an attempt to increase the skin thickness. Chemicals attempted were phenol-formaldehyde resin, urea-formaldehyde resin, gelatin, mixtures of gelatin with phenol-formaldehyde, n-methylolacrylamide, and urea. Urea proved to be unexpectedly superior for skin development on the surface of a cellulosic fiber-containing substrate, particularly for low density (10–35 pounds/ft.$^3$) fiberboard panels, as shown in Table II:

Table II

EFFECT OF CHEMICAL SURFACE SPRAY
Skin Thickness (In.) at Equivalent Cost Level

| | 5/MFt$^2$ | | 10/MFt$^2$ | | 20/MFt$^2$ | | |
|---|---|---|---|---|---|---|---|
| Chemical | Pounds/MFt$^2$ | Skin Thickness | Pounds/MFt$^2$ | Skin Thickness | Pounds/MFt$^2$ | Skin Thickness | REMARKS |
| urea | 55 | .026 | 111 | .032 | 222 | .033 | Tough, smooth, but poor bond between skin and mat |
| gelatin/ phenol-formaldehyde | 7 | .015 | 15 | .022 | 29 | .030 | Glossy surface film |
| urea-formaldehyde | 42 | .013 | 83 | .019 | 167 | .024 | Hard surface but blistered in spots on all boards |
| n-methylol-acrylamide | 7 | .014 | 14 | .017 | 27 | .018 | Tough, smooth surface with good bond to mat |
| gelatin | 6 | — | 12 | — | 25 | — | When exposed to hot platens the surface gummed up, charred, and stuck to platen |
| phenol-formaldehyde | 24 | .014 | 48 | .014 | 95 | .024 | Reddish brown flat surface, tight bond to mat |

In attempting to achieve thicker surface skins on the handleable mat during post-pressing it was found that urea should deeply penetrate the surface fibers of the handleable mat prior to post-pressing. Surface spraying therefore led to the impregnation method of incorporating urea into the handleable mat.

IMPREGNATION PROCESS

It has been found that when urea is impregnated into the surface of a handleable mat after inital consolidation of that mat, a much thicker skin can be produced by vacuum impregnating the urea to provide a skin thickness in the range of 0.060 inch. Surprisingly, urea is the only chemical impregnant able to achieve a skin thickness of 0.060 inch, regardless of the depth of penetration of the impregnant.

In testing various degrees of urea penetration by vacuum impregnating the handleable mat after initial consolidation, it was found that increasing the depth of urea penetration beyond that required to produce 0.060 inch skins, for example, at a level of 111 pounds/thousand square feet, does not improve the physical properties of the panel, nor does it increase the skin thickness beyond 0.070 inches.

In accordance with the results achieved as set forth in Table III, each material was applied to the surface of a 20 pounds/cubic foot handleable mat at an equivalent cost level and a vacuum box was utilized on the under surface of the mat to insure deep penetration of the impregnant. After impregnation, each mat was dried so that the moisture content in the hot-press (post-press) did not exceed 10% (wet basis). The post-press conditions were as follows:

Platen Temperature—550° F. (Both Sides)
Closing Speed—Fast as Possible
Holding Time at Caliper—30 Seconds
Caliper—⅜"
Pressure—500 psi
Opening Speed—Fast as Possible

Table III

Effect of Impregnation

| Treatment | Caliper (In.) | Density (#/ft³) | Skin Thickness (In.) | % Increase in Skin Thickness |
|---|---|---|---|---|
| phenol-formaldehyde gelatin/ | .615 | 26.5 | .047 | 136 |
| phenol-formaldehyde n-methylol- | .611 | 28.8 | .033 | 50 |
| acrylamide urea formal- | .612 | 24.7 | .031 | 82 |
| dehyde | .633 | 25.0 | .036 | 89 |
| urea* | — | — | .060 | 88 |

*Note: Skins separated from urea treated mats after post-pressing.

It should be noted that while the urea was the best penetrant for achieving a thick, hard, dense, tough skin on the surface of a handleable mat, each of these urea skins delaminated upon post-press treatment so that a secondary, and a difficult problem of adhering the skins to the core material remained.

Investigations to find a solution to the skin delamination problem led to the theory that perhaps urea penetrated into the core of material and disintegrated or otherwise interfered with the urea-formaldehyde binder at the interface, causing skin delaminations.

Handleable mats having a density of 25 pounds/cubic foot were formed containing 8% phenol-formaldehyde resin as the binder. Two such handleable mats were impregnated on each surface with urea in amounts of 28 and 55 pounds/thousand square feet/side. The phenol-formaldehyde containing handleable mats were then post-pressed under the following conditions:

Press Conditions:
Platen Temperature—550° F.
Closing Time—Fast as Possible
Pressure (Maximum)—200 psi
Holding Time at Caliper—30 Seconds
Caliper—⅜"
Opening Time—Slow (10-15 Seconds)

Quite surprisingly, the mats did not delaminate after post-pressing. In comparison with the same board containing 8% urea-formaldehyde resin binder it was observed that the skins produced on the urea-formaldehyde binder boards were always thicker than the skins obtained on the phenol-formaldehyde binder boards, as set forth in Table IV:

Table IV

EFFECT OF MAT BINDER ON SKIN THICKNESS

| Handleable Mat Binder | Urea Impregnation (lbs/MFt²) | Skin Thickness (inch) |
|---|---|---|
| urea-formaldehyde | 28 | .032" |
|  | 55 | .050" |
| phenol-formaldehyde | 28 | .024" |
|  | 55 | .027" |

Accordingly, the handleable mat can be manufactured with a combination of resin binders to take advantage of the thicker skins achieved when a urea-formaldehyde binder is used and to take advantage of the absence of delamination when a second binder, such as phenol-formaldehyde, is employed. Further, it was found that when urea is combined by impregnating the handleable mat, the hardest (most abrasive) skin was provided by the combination of urea-formaldehyde with phenol-formaldehyde binders. Handleable mats were produced using, as a binder, phenol-formaldehye resin and a combination (1:1 weight ratio) of phenol-formaldehyde resin with urea-formaldehyde resin—each of these mats was impregnated with urea on its surface and post-pressed without delamination. The consolidation and post-press conditions were as follows:

Handleable Mat Manufacture (Dry Process):
1. Urea-formaldehyde/phenol-formaldehyde binder system:
   Pre-press—50 psi
   Steam Pressure—90 psig
   Caliper—0.625"
   Time at Caliper—6 minutes
2. Phenol-formaldehyde binder system:
   Pre-press—50 psi
   Steam Pressure—550 psig
   Caliper—625"
   Holding Time—7 minutes or as long as it takes for the core to reach 325° F.

Post-Press Conditions:
Platen Temperature—550° F.
Caliper—0.550"
Holding Time—30 seconds The characteristics of the boards are set forth in Table V:

Table V

EFFECT OF MAT BINDER ON BOARD PROPERTIES

| Resin System | Resin Content % | Urea Impregnation Level lbs./Ft²/Side | Caliper In. | Density lb/ft³ | Stiffness (Slope of Elastic Line) lb/in. | Maximum Load lb over 10" Span |
|---|---|---|---|---|---|---|
| Phenol-Formaldehyde | 9 | .011 | .545 | 23.5 | 100 | 13 |
|  |  | .033 | .523 | 24.7 | 125 | 17 |
|  |  | .044 | .525 | 26.6 | 60 | 11 |

Table V-continued

EFFECT OF MAT BINDER ON BOARD PROPERTIES

| Resin System | Resin Content % | Urea Impregnation Level lbs./Ft$^2$/Side | Caliper In. | Density lb/ft$^3$ | Stiffness (Slope of Elastic Line) lb/in. | Maximum Load lb over 10" Span |
|---|---|---|---|---|---|---|
| | | .055 | .530 | 25.4 | 110 | 15 |
| | 15 | .011 | .536 | 24.0 | 105 | 17 |
| | | .022 | .534 | 24.2 | 120 | 18 |
| | | .033 | .515 | 25.3 | 115 | 16 |
| | | .044 | .520 | 24.8 | 140 | 16 |
| | | .055 | .529 | 25.2 | 170 | 23 |
| Phenol-Formaldehyde/ Urea-Formaldehyde | | | | | | |
| | 9 | .011 | .494 | 25.6 | 225 | 44 |
| | | .022 | .492 | 25.4 | 245 | 43 |
| | | .033 | .496 | 25.6 | 225 | 30 |
| | | .044 | .487 | 25.6 | 260 | 41 |
| | | .055 | .492 | 26.1 | 330 | 46 |
| | 15 | .011 | .482 | 25.2 | 190 | 36 |
| | | .033 | .493 | 25.7 | 240 | 34 |
| | | .044 | .498 | 25.6 | 290 | 41 |
| | | .055 | .505 | 25.8 | 310 | 38 |
| Hardboard | | | .220 | 58.6 | 64 | 41 |

It was further found that boards containing a combination of urea-formaldehyde and phenol-formaldehyde binders are stiffer and stronger than the phenol-formaldehyde bonded boards. The less expensive resin system—this is, the combination of phenol-formaldehyde and urea-formaldehyde produced a thick, lightweight panel that was stiffer and as strong as hardboard having a density of almost 60 pounds/ft$^3$.

The skin thickness measurements for the post-pressed, urea-treated, urea-formaldehyde/phenol-formaldehyde (1:1 weight ratio) bonded mats are set forth in Table VI:

Table VI

| | UREA IMPREGNATION | | | | |
|---|---|---|---|---|---|
| Resin Content | Skin Thickness at the following urea treatment levels | | | | |
| % | .011 lb urea/Ft$^2$/side | .022 | .033 | .044 | .055 |
| 9 | .026 | .031 | .021 | .028 | .035 |
| 15 | .025 | — | .028 | .032 | .038 |

It is preferred to combine the phenol-formaldehyde and urea-formaldehyde resins in a 1:1 weight ratio, and to use a total resin content in the range of 6–20% by weight of total board (dry basis). However, the amount of secondary binder, such as phenol-formaldehyde resin, can vary over a wide range.

OVERLAY PROCESS

It is quite surprising that delamination of the skins from the core can be prevented when the urea is included in overlay fibers in manufacturing the handleable mat, regardless of the particular mat binder. When urea-formaldehyde is the sole synthetic binder in the handleable mat, no delamination occurs so long as the urea is combined in an amount not more than about 20% by weight of the overlay fibers. The urea can be combined in amounts greater than 20% by weight of the overlay fibers so long as the handleable mat contains an additional binder, such as phenol-formaldehyde. Accordingly, when urea is blended in the overlay fibers, as opposed to impregnation into a consolidated handleable mat, phenol-formaldehyde is not necessary as a binder in the core material. It has been found that any suitable binder such as urea-formaldehyde can be used to form the handleable mat without delamination, so long as urea is included by the overlay process during manufacture.

As set forth above, under the impregnation process, the presence of urea in a urea-formaldehyde resin binder board severely retards the ability of the urea-formaldehyde binder to cure at normal pressing conditions. However, since the urea treated face layers are completely converted into a strong, dense skin by the secondary, high-temperature pressing operation (post-press) the urea-formaldehyde resin in the face layers does not have to be completely cured during the manufacture of the handleable mat, regardless of the urea incorporation process. Tests have shown that the final post-pressed panel bending properties are not dependent on the resin content of the face layer. Accordingly, in accordance with a preferred embodiment of the overlay incorporation procedure, the resin content of the face layers does not have to be as high as the resin content of the core layer—it need only be high enough to satisfy the handleability requirement. For example, approximately 4% resin binder in the face layers is sufficient as compared to 8% resin content in the core.

A handleable mat was produced having a basis weight of 1.05 dry pounds per square foot by dry forming the mat in three layers from three separate head boxes with urea blended into the two surface layers, and consolidating to produce a handleable mat having urea in two distinct surface layers but not in the central core. The amount of urea blended into the overlay or surface layers was 12% by weight of overlay fibers. Urea-formaldehyde resin binder was distributed in the core in an amount of 8% by weight and in the face layers in an amount of 4% by weight. The face/core/face weight ratio was 1/3/1. The mat consolidation pressing conditions were as follows:
Platen Temperature—280° F.
Closing Speed—Fast as Possible
Pressure—150 psi
Caliper—0.46"
Time—6 minutes (Total Cycle)

To provide for better surface smoothness and paint holdout, the handleable mat so produced, having a density of 27 pounds/ft.$^3$ was also surface treated with urea in an amount of 11 pounds of urea per thousand square feet by spraying an aqueous solution of urea onto the surface of the mat just prior to post-pressing. The three-layer mat surface treated with urea was then post-pressed under the following conditions without delamination:

Platen Temperature—550° F.
Closing speed—Fast as Possible
Pressure—200 psi
Caliper—0.38"(⅜")
Holding Time—30 Seconds The urea treated, post-pressed fiberboard was compared to Gypsum board, plywood panelling, and hardboard panelling with the results shown in Table VII:

Table VII

| Drawing Identification Letter | Substrate | Caliper (In.) | Basis Weight (lb/MFt$^2$) | Density (lb/ft$^3$) | Stiffness (lb/in) | Breaking Load (lb.) | Work To Failure (in-lb.) |
|---|---|---|---|---|---|---|---|
| A | Post-Pressed Low Density Handleable Mat | 0.38 | 1,070 | 34 | 220 | 75 | 16 |
| B | Gypsum Board | 0.50 | 1,830 | 44 | 550 | 57 | 10 |
| C | Hardboard | 0.22 | 1,070 | 59 | 64 | 43 | 23 |
| D | Lauan 3-Ply Plywood Panelling | .014 | 380 | 32 | 12 | — | —* |

Load/Deflection tests on the panels of Table VII are shown in the drawing. Hardboard of equivalent basis weight (C) breaks at about half the load supported by the low density panel produced in accordance with the present invention (A).

In addition to being stiffer and stronger than hardboard having a much greater density, the surface characteristics of the low density panel are superior with respect to hardness, embossing fidelity, and paint holdout. "Design fidelity" or simply "fidelity" as used herein is a measure of the accuracy of reproduction of the design of an embossing plate onto the surface of a consolidated mat. The panel produced in accordance with the present invention permits deeper embossing patterns because of the low density. "Paint holdout" is the ability of a panel to keep paint on its surface without a significant amount striking into the panel.

The above prepared handleable mat treated with urea in its surface layers was hot-pressed to panels having calipers or thicknesses of ⅜ inch, 7/16 inch, and ½ inch and the final density, stiffness, breaking load, and work to failure of each caliper panel are set forth in Table VIII:

Table VIII

SKIN THICKNESS ON LOW DENSITY PANELS

| Caliper (In.) | Density (lb/ft$^3$) | Basis Weight (lb/ft$^2$) | Stiffness (lb/in) | Breaking Load (lb) | Work To Failure (In-lb) | Skin Thickness (In.) |
|---|---|---|---|---|---|---|
| 0.50 | 26 | 1.07 | 280 | 62 | 9 | .052 |
| 0.44 | 30 | 1.07 | 260 | 76 | 14 | .051 |
| 0.38 | 34 | 1.07 | 220 | 79 | 17 | .055 |

The skin thickness was found to be about the same on each panel regardless of panel density.

Attempts to increase the skin thickness by increasing the temperature and time of post-pressing led to the results shown in Table IX:

Table IX

EFFECT OF TEMPERATURE AND TIME ON SKIN THICKNESS

| Platen Temperature | Holding Time | Skin Thickness, Inch Face/Core Weight Ratio | |
|---|---|---|---|
| | | 2/3 | 2/2 |
| 550° F. | 30 Sec. | .069" | .058" |
| | 60 Sec. | .062" | .076" |
| 600° F. | 30 Sec. | .062" | .070" |
| | 60 Sec. | .062" | .074" |

The handleable mats of Table IX each had a thickness of 5/8 of an inch, a density of 20 pounds/cubic foot and face/core weight ratios of ⅔, and 2/2. Each mat was bonded with a 1:1 weight mixture of phenol-formaldehyde and urea-formaldehyde resins at a 9% resin content. The face fibers were treated with urea at a level of 55 pounds/thousand square feet/face for the ⅔ face/core weight ratio mat and at a level of 69 pounds/thousand square feet/face for the 2/2 mat. A skin thickness, as recorded in Table IX, represents the average of at least ten measurements. The differences in the skin thicknesses cannot be considered significant because there is considerable variation and overlapping of the measurements, as shown in the range of skin thicknesses set forth in Table X:

Table X

| RANGE OF SKIN THICKNESS MEASUREMENTS, INCH | | | |
|---|---|---|---|
| Platen Temperature | Holding Time | Face/Core Weight Ratio | |
| | | 2/3 | 2/2 |
| 550° F. | 30 Sec. | .052–.075 | .049–.083 |
| | 60 Sec. | .051–.075 | .056–.094 |
| 600° F. | 30 Sec. | .050–.087 | .061–.083 |
| | 60 Sec. | .052–.068 | .060–.093 |

It has been found that increasing the resin binder content in the overlay layers, when including urea with the overlay fibers during manufacture of the handleable mat, did not improve the post-pressed panel. It has also been found that post-pressing provides increased stiffness to the product but, to a small extent, weakens the core material during post-pressing. The amount of pressure used in post-pressing should not go beyond 300 psi. Some caliper reduction, however, must result during post-pressing to apply both heat and pressure necessary for thick skin development. Contact (unregistrable) pressure is sufficient for slight caliper reduction. It has been found that as the fibers are compressed during the post-pressing operation, the density increased in the overlay layers and, to some extent, in the core material. Thereafter, the core begins to resist compression. Accordingly, the face or overlay layers will compress more than the core.

A handleable mat having a constant basis weight was cut into equal size boards and compressed to varying calipers to provide samples having different densities in order to determine the optimum thickness and core strength properties of the product. The results are shown in Table XI:

Table XI

EFFECT OF CALIPER ON BOARD PROPERTIES

| Final Product Caliper (In.) | Basis Weight (lb/ft²) | Density (lb/ft³) | Stiffness (lb/in) | Breaking Load (lb) | Work To Failure (In-lb) | Type of Failure |
|---|---|---|---|---|---|---|
| ½" | 1.08 | 25.9 | 284 | 62 | 9.1 | Tensile (Skin) |
| 7/16" | 1.07 | 29.5 | 271 | 76 | 14.1 | Tensile |
| 3/8" | 1.08 | 34.0 | 234 | 79 | 16.7 | Tensile |

The following example is a preferred embodiment for producing a low density, post-pressed fiberboard panel by the overlay process:

A. Handleable Mat Forming Conditions:
 1. Basis Weight—1.05 O.D. lbs/ft²
 2. Face/Core Weight Ratio—2/3
 3. Urea Treatment Level in Face Layers—12%
 4. Petrolatum Content—1.3%
 5. Resin—Urea-formaldehyde
 6. Resin Content, Face/Core—4%/8%

B. Handleable Mat Pressing Conditions:
 1. Platen Temperature—280° F.
 2. Closing Speed—6 ft/min
 3. Pressure—150 psi
 4. Final Caliper—0.500"
 5. Holding Time—4 min.—conventional heated platens—and, 1 min.—radio frequency heating C. Surface Treatments:
 Top surface of handleable mat is coated with additional 11 lb/MFt² urea, using a 50% solution prior to post-pressing.

D. Post-Pressing Conditions:
 1. Platen Temperature—550° F.
 2. Closing Speed—Fast as Possible
 3. Pressure—200 psi
 4. Caliper—⅜"
 5. Holding Time—30 Seconds Table XII shows a comparison of properties between the above-formed, low density stress skin panel and hardboard:

Table XII

| Property | Post-Pressed Fiberboard Panel | Hardboard |
|---|---|---|
| caliper, in. | 0.375 | 0.210–0.220 |
| basis weight, lb/ft² | 1.07–1.12 | 0.99–1.19 |
| gravity | 0.54–0.58 | 0.94–1.00 |
| stiffness, lb/in. | 220 | 65 |
| breaking load, lb. | 75 | 45 |
| work to failure, in-lb. | 16 | 23 |
| impact, in.* | 10/10 | 30/14 |
| nail head pull through, lbs.** | 80 | 190 |
| nail edge tear out, lbs.** | 110 | 165 |
| 24 hour absorption, %*** | 60% | 24 |
| 24 hour swell, %*** | 14–24 | 14 |

Table XII-continued

| Property | Post-Pressed Fiberboard Panel | Hardboard |
|---|---|---|
| internal bond, psi**** | 20 | 180 |

*Cumulative drops at 1" increments to height causing failure on top/bottom surfaces.
**Nail pull and edge tear out tested in accordance with ASTM D-1037.
***Water absorption and swell tested in accordance with ASTM D-1037.
****The internal bond value listed for the low density product is skin/core interface bond strength.

Buckling comparisons over a 16" span have shown that the low density, ⅜" product is more resistant to buckling than ¼" hardboard. Table XIII illustrates the buckling resistance of these two products:

Table XIII

| | Buckle, (in.) | |
|---|---|---|
| Humidity Conditions | Post-Press Fiberboard Panel | Hardboard |
| 90° F./70% R.H. | 0.021 | 0.043 |
| 90° F./80% R.H. | 0.033 | 0.202 |
| 90° F./90% R.H. | 0.042 | 0.310 |

POST-PRESS CONDITIONS

The handleable mat having a density of less than 35 pounds per cubic foot is "post-pressed" at a temperature of at least 525° F. To achieve the full advantage of the present invention, the temperature of "post-pressing" should not exceed 650° F. It is preferred to "post-press" at a temperature in the range of 525°–575° F.

To maintain a relatively low density core material in the fiberboard product, the pressure used in "post-pressing" should not exceed about 300 psi. Pressures can vary depending upon the density of the handleable mat—with lower density mats (ie 10–20 pounds per cubic foot) it is preferred to use pressures on the order of 30–150 psi in post-pressing. It is always preferred to use a "post-press" pressure less than 200 psi. The time of post-pressing is not critical and preferably is in the range of 5 to 60 seconds. With higher temperatures in the range of 575°–650° F., it is desirable to remove the product from the post-press operation within about 30 seconds to avoid charring or decomposition of the surface skins.

AMOUNT OF UREA

The amount of urea necessary to form a sufficient skin thickness for the purpose of the present invention is at least about 5% by weight of the fibers contacted. That is, when combined by the impregnation process, the weight percent of urea needed is at least 5% based upon the dry weight of the surface material in which the chemical has penetrated. When combined by the overlay process, the weight percent of urea needed is at least 5% based upon the dry weight of overlay material.

The maximum amount of urea which can be incorporated into the handleable mat is dependent upon the presence of urea-formaldehyde resin binders in the mat. Phenolic resin bonded mats can be treated with higher levels of urea than mats bonded with urea-formaldehyde resins. As the urea content of the surface layers increases, the stiffness of the post-pressed panel will increase; also, the skins become more distinct and the post-embossing fidelity and coating holdout improve.

To achieve the full advantage of the present invention, the urea content incorporated into the handleable mat should be in the range of 6–20% based on the dry weight of the material contacted therewith, and preferably in the range of 9-17% by weight. When a binder other than urea-formaldehyde resin, such as phenol-formaldehyde resin, is used in forming the handleable mat, the urea content has no maximum. However, no advantage is realized in terms of skin thickness or other properties by using more than about 20% urea, based on the dry weight of contacted mat material. When urea-formaldehyde is the sole binder used in forming the handleable mat, urea can be incorporated by the overlay process in an amount not exceeding about 30%, based on the dry weight of overlay material.

The product formed by the process of the present invention includes a hard, dense, smooth skin having a density in the range of 40-55 pounds/ft$^3$, generally about 50 pounds/ft$^3$. The composition of the skin cannot be determined by analysis. The base layer or core material underlying the skin has a density of 10-35 pounds per cubic foot, so that lightweight products of varying density can be manufactured having hard skins thereon as thick as 0.070 inch.

Although the present invention is described in terms of particular constituents, and ranges thereof, and manner of making and using the same, it is recognized that departures may be made therefrom within the scope of the invention as defined in the appended claims.

We claim:

1. A fiberboard product comprising a base layer comprising cellulosic fibers and a binder, said base layer having a density in the range of 10-35 pounds/ft$^3$; and an integral skin disposed on at least one face of said base layer, said skin having a density in the range of 40-55 pounds/ft$^3$ and formed by including urea within the surface fibers of said fiberboard, in an amount of 5-20% based on the dry weight of fibers containing urea, consolidating said fiberboard to provide a base layer having a density in the range of 10-35 pounds/ft$^3$, and thereafter heating said contacted surface fibers, under pressure, at a temperature of at least 525° F., to form said skin during hot-pressing on the surface of said mat containing urea.

2. A method of manufacturing cellulosic fiber containing board having a skin on at least one surface thereof comprising:
   compressing a fibrous composition, containing cellulosic fibers, under heat and pressure to form a consolidated mat having a density of less than 35 pounds per cubic foot;
   including urea in at least a surface layer of fibers of said mat in an amount in the range of 5-20% based on the dry weight of said surface layer; and
   hot-pressing said consolidated mat containing urea in at least its surface fibers, at a temperature of at least 525° F. to form a board having a skin on at least one surface thereof, said skin defined by a layer of material on said surface of said board having a density greater than the material on which the skin is formed, said skin formed during said hot-pressing of said mat including urea.

3. A method as defined in claim 2 wherein said consolidated mat is formed by including urea in the surface fibers as an overlay, said method further comprising depositing a first layer of fibers to form a core of fibers; depositing a second layer of fibers, containing urea therewith, over said core of fibers whereby said second layer of fibers intermingles with said core of fibers such that said second layer of fibers containing urea becomes an integral part of said core of fibers; consolidating said first and second layers to form a mat having a density in the range of 10-35 pounds/ft$^3$; and thereafter hot-pressing said consolidated mat at a temperature of at least 525° F.

4. A method as defined in claim 3 wherein said second layer of fibers contains urea in an amount of at least 5% based on the dry weight of said second layer.

5. A method as defined in claim 2 wherein said urea containing mat is hot-pressed at a temperature in the range of 525°-650° F.

6. A method of forming a cellulosic fiber containing board having a relatively dense skin on at least one of its surfaces comprising:
   impregnating a consolidated cellulosic fiber containing mat, having a density of less than 35 pounds/ft$^3$, with urea in an amount in the range of 5-20% based on the dry weight of the mat material contacted with urea; and
   pressing said impregnated mat at a temperature of at least 525° F., said skin formed during said hot-pressing on the surface of said mat impregnated with urea.

7. A method as defined in claim 6 wherein said impregnated mat is pressed at a temperature in the range of 525°-650° F.

8. In a method of manufacturing a fiberboard, including the steps of hot-pressing a cellulosic fibercontaining mat to consolidate said mat into a unitary structure having a density less than 35 pounds per cubic foot, the improvement comprising impregnating at least one surface of said consolidated mat with urea in an amount of at least 5% based on the dry weight of the portion of the mat contacted with said urea and thereafter hot-pressing said impregnated, consolidated mat at a temperature of at least 525° F. for a period of time sufficient to form a hard, dense skin on the surface of said mat, said skin formed during said hot-pressing on the surface of said mat contacted with urea.

9. In a method as defined in claim 8 including hot-pressing said impregnated, consolidated mat at a pressure not exceeding 300 psi.

10. In a method as defined in claim 9 including hot-pressing said impregnated, consolidated mat at a pressure in the range of 30-300 psi.

11. In a method as defined in claim 10 including hot-pressing said impregnated, consolidated mat at a pressure in the range of 100-250 psi.

12. A method of forming a hard, dense skin on the surface of a fiberboard comprising:
   contacting the surface fibers of a cellulosic fiber-containing handleable mat, having a density less than 35 pounds per cubic foot, with urea; and thereafter hot-pressing said mat after consolidation in a heated press at a temperature of at least 525° F. to form a board having a skin on said surface of said mat, having a density greater than the density of material on which the skin is formed, said skin formed during said hot-pressing on the surface of said mat contacted with urea.

13. A method as defined in claim 12 wherein said mat is hot-pressed at a temperature in the range of 525°-650° F. and at a pressure not exceeding 300 psi.

14. A method as defined in claim 12 wherein said heated press includes a vent plate for the escape of gases formed in said press.

15. A method of manufacturing a cellulosic fiber-containing board having a skin on at least one surface thereof comprising:

forming a cellulosic fiber-containing handleable mat, having a density in the range of 10-35 pounds per cubic foot and having a synthetic binder selected from the group consisting of phenol-formaldehyde, urea-formaldehyde, and starch;

impregnating said handleable mat with urea; and hot-pressing said impregnated handleable mat at a temperature of at least 525° F. to form a board having a skin on at least one surface thereof, said skin formed during hot-pressing on the surface of said mat impregnated with urea.

16. A method as defined in claim 15 wherein said binder comprises starch.

17. A method as defined in claim 15 wherein said urea-formaldehyde resin comprises no more than 90% by weight of total binders in said board.

18. A method as defined in claim 15 wherein the handleable mat contains phenol-formaldehyde resin and urea-formaldehyde resin binders.

19. A method as defined in claim 15 wherein said handleable mat is impregnated with urea in an amount in the range of 5-20% based on the total dry weight of mat material contacted by said urea.

20. A method of manufacturing a cellulosic fiber-containing board having a skin on at least one surface thereof comprising:

depositing a first layer of fibers to form a base layer for supporting at least one surface skin thereon;

depositing a second layer of fibers over said first layer of fibers, said second layer of fibers including urea in an amount of at least 5% based on the total weight of said second layer of fibers;

consolidating said first and second layers in a heated press at a temperature less than 500° F. and at a pressure less than 700 psi to form a consolidated, handleable mat having a density in the range of 10-35 pounds/ft$^3$; and thereafter hot-pressing said consolidated, handleable mat at a temperature in the range of 525-650° F., and at a pressure not exceeding 300 psi to form at least one skin on said base layer, said skin formed during said hot-pressing on the surface of said mat including urea.

21. A method as defined in claim 20 further including depositing a third layer of fibers in contact with said base layer, prior to consolidation of said first and second layer to thereby sandwich said base layer between said second and third fibrous layers, said third layer of fibers including urea in an amount of an amount of a least five percent based on the total weight of said third layer of fibers; and consolidating said three layers to a density in the range of 10-35 pounds/ft$^3$.

22. A method as defined in claim 20 wherein said second and third layers contain about half the amount of binder as the base layer.

23. A method as defined in claim 19 wherein the amount of urea in said second layer is in the range of 9-17% by dry weight of said second layer.

24. A method of manufacturing a cellulosic fiber containing board having a skin on at least one surface thereof comprising:

depositing a water slurry of cellulosic fibers onto a water pervious support member to form a wet mat;

drying said wet mat to less than 8% water, based on the total weight of said mat, to consolidate said mat, wherein said consolidated mat has a density of less than 35 pounds per cubic foot;

including urea in at least the surface layer of fibers of said mat in an amount in the range of 5-20% based on the dry weight of said surface layer; and hot-pressing said consolidated mat containing urea in at least its surface fibers, at a temperature of at least 525° F. to form a board having a skin on at least one surface thereof, said skin defined by a layer of material on said surface of said board having a density greater than the material on which the skin is formed, said skin formed during hot-pressing on the surface of said mat including urea.

25. A method as defined in claim 24 wherein said consolidated mat is formed by including urea in the surface fibers as an overlay, said method further comprising depositing a first layer of fibers to form a core of fibers; depositing a second layer of fibers, containing urea therewith, over said core of fibers whereby said second layer of fibers intermingles with said core of fibers such that said second layer of fibers containing urea becomes an integral part of said core of fibers; consolidating said first and second layers to form a mat having a density in the range of 10-35 pounds/ft$^3$; and thereafter hot-pressing said consolidated mat at a temperature of at least 525° F.

26. A method as defined in claim 24 wherein said urea containing mat is hot-pressed at a temperature in the range of 525°-650° F.

27. In a method of manufacturing a fiberboard, including the steps of consolidating a cellulosic fiber-containing mat into a handleable mat having a density less than 35 pounds per cubic foot, the improvement comprising impregnating at least one surface of said consolidated mat with urea in an amount of at least 5% based on the dry weight of the portion of the mat contacted with said urea, and thereafter hot-pressing said impregnated, consolidated mat at a temperature of at least 525° F. for a period of time sufficient to form a hard, dense skin on the surface of said mat, said skin formed during said hot-pressing on the surface of said mat contacted with urea.

28. In a method as defined in claim 27 including hot-pressing said impregnated, consolidated mat at a pressure not exceeding 300 psi.

29. A method of manufacturing a cellulosic fiber-containing board having a skin on at least one surface thereof comprising:

forming a consolidated cellulosic fiber-containing handleable mat, having a density in the range of 10-35 pounds per cubic foot and having a cured thermosetting resin binder;

including urea in at least a surface layer of fibers of said mat; and hot-pressing said consolidated mat having said cured thermosetting resin, at a temperature of at least 525° F. to form a board having a skin on at least one surface thereof, said skin formed during said hot-pressing on the surface of said mat including urea.

30. A method as defined in claim 29 wherein said urea is included in said mat prior to consolidation thereof.

31. A method as defined in claim 29 wherein said urea is included in said mat after consolidation thereof.

32. A method of manufacturing a cellulosic fiber-containing board having a skin on at least one surface thereof comprising:

depositing a layer of fibers including cellulosic fibers onto a support member to form a loose mat containing cellulosic fibers;

consolidating said mat to bond said cellulosic fibers together to form a completed board;

contacting at least a surface of said completed board with urea in an amount sufficient to form a surface portion having a density greater than the density of the material thereunder; and hot-pressing said contacted surface at a temperature of at least 525° F. to densify said surface while maintaining a relatively low density core adjacent to said densified surface, said higher density surface portion being formed during said hot-pressing on the surface of said mat contacted with urea.

33. A method as defined in claim 32 further including drying said urea contacted mat prior to hot-pressing said contacted surface.

34. A method of manufacturing a cellulosic fiber-containing board having a skin on at least one surface thereof comprising:

depositing a layer of fibers including cellulosic fibers onto a support member to form a loose mat containing cellulosic fibers;

contacting at least a surface of said mat with urea in an amount sufficient to form a surface portion having a density greater than the density of the material thereunder;

consolidating said urea contacted mat to bond said cellulosic fibers together to form a completed board; and hot-pressing said completed board at a temperature of at least 525° F. to densify said surface while maintaining a relatively low density core adjacent to said densified surface, said higher density surface portion being formed during said hot-pressing on the surface of said mat contacted with urea.

35. A method as defined in claim 34 further including contacting a surface of the consolidated board with urea prior to hot-pressing at a temperature of at least 525° F.

* * * * *

UNITED STATES PATENT AND TRADEMARK OFFICE
CERTIFICATE OF CORRECTION

PATENT NO. : 4,175,150

DATED : November 20, 1979

INVENTOR(S) : Allan J. Luck, John T. Clarke, Michael R. Hoffman

It is certified that error appears in the above-identified patent and that said Letters Patent are hereby corrected as shown below:

Claim 21, Column 17, line 49 should read -

--including urea in an amount of at least five--

Signed and Sealed this

Twenty-sixth Day of February 1980

[SEAL]

Attest:

SIDNEY A. DIAMOND

Attesting Officer

Commissioner of Patents and Trademarks